United States Patent [19]

Banton

[11] Patent Number: 4,524,395
[45] Date of Patent: Jun. 18, 1985

[54] MULTI-MODE REPRODUCTION APPARATUS

[75] Inventor: Martin E. Banton, Fairport, N.Y.

[73] Assignee: Xerox Corporation, Stamford, Conn.

[21] Appl. No.: 487,636

[22] Filed: Apr. 22, 1983

[51] Int. Cl.³ .................. H04N 1/30; G01D 15/14
[52] U.S. Cl. ................... 358/300; 346/160; 358/285
[58] Field of Search .......... 346/108, 160; 358/285, 358/286, 300, 302

[56] References Cited

U.S. PATENT DOCUMENTS

| | | | |
|---|---|---|---|
| 3,603,730 | 9/1971 | Weigl | 178/7.1 |
| 3,980,893 | 9/1976 | Merlen | 250/572 |
| 4,251,821 | 2/1981 | Kimura | 358/285 X |
| 4,336,993 | 6/1982 | Banton | 355/3 R |
| 4,343,531 | 8/1982 | Tateoka et al. | 350/6.5 |
| 4,345,835 | 8/1982 | Kramer et al. | 355/3 R |
| 4,408,871 | 10/1983 | Kojima | 358/300 X |

Primary Examiner—Thomas H. Tarcza
Attorney, Agent, or Firm—Frederick E. McMullen

[57] ABSTRACT

A multi-function reproduction apparatus selectively operable to either copy, write, or read. For reading, the image to be read is processed xerographically to provide a developed image on the apparatus photoconductive member which is raster scanned with a high intensity beam. Light reflected from the photoconductive member is captured in an elongated rod-like collector disposed proximate the photoconductive member and transmitted axially along the collector rod to a light detector at one end where the light is converted to an electrical image signal or pixel by the detector. The intensity of the beam is regulated to assure a uniform light intensity at the detector irrespective of the distance through which the light travels within the collector rod.

6 Claims, 9 Drawing Figures

MULTI-MODE REPRODUCTION APPARATUS

The invention relates to a light collection system for use in collecting light reflections from the photoconductive member of a xerographic system when reading a document original and converting the same to image signals or pixels representative of the document image, and more particularly, to an improved collection system in which the intensity of the beam is controlled to provide uniform intensity levels to the collection system.

In xerographic systems of the type wherein the toner developed image on the system photoconductive member is scanned by a flying spot beam, the light reflections therefrom are converted to analog image signals representative of the developed image being scanned. One manner of doing so utilizes a light collector disposed adjacent the photoconductive surface to gather or collect the scattered and reflected light emanating from the photoconductive surface.

The light collector typically comprises a rod-like element of somewhat extended axial length which in many cases is equal to or slightly larger than the dimension of the photoconductive surface on which the images being read are developed. A single light detector or sensor, typically a photocell, is normally used to detect the presence of light in the collector rod, the detector being located at one end of the rod. The design and various materials that comprise the collector rod as well as the disposition of the rod in the system are chosen to assure that light reflected from any point along the width of the scan line on the photoconductive surface is captured by the collector rod. Light entering the interior of the collector rod is trapped and transmitted axially along the rod and to the detector at one end. Where the point of entry of the light is near the detector, the distance over which the light must travel through the rod is relatively small. On the other hand, where the point of entry of the light into the collector rod is remote from the detector, the distance over which the light must travel through the rod to the detector is relatively long, and in this context it has been observed that the distance that the light must travel through the collector rod has a direct bearing on the intensity of the light at the detector. This variation in light intensity affects in an adverse way the signal response of the detector and can lead to erroneous image or inaccurate signal outputs.

The invention relates to an apparatus for raster scanning a tone image on a photoconductive member with a light beam having a light collector rod adjacent the photoconductive member for capturing light reflected from the photoconductive member and the developed image thereon, and a light detector at one end of the collector rod for converting light entering the collector rod into image signals, the improvement comprising: means for controlling the intensity of the light beam as the beam scans across the photoconductive member to provide a substantially uniform intensity at the detector whatever the point of light entry into the collector rod.

IN THE DRAWINGS

There is shown herein a multi-mode reproduction apparatus operable selectively in a COPY mode to xerographically make copies of original documents in the manner typical of xerographic copiers or machines, in a WRITE mode to xerographically produce copies from image signals input thereto using a flying spot type scanner, and in a READ mode to read images developed on the machine photoreceptor with the same flying spot scanner to produce image signals representative thereof and thereby convert the image to electronic signals.

Figure 1:
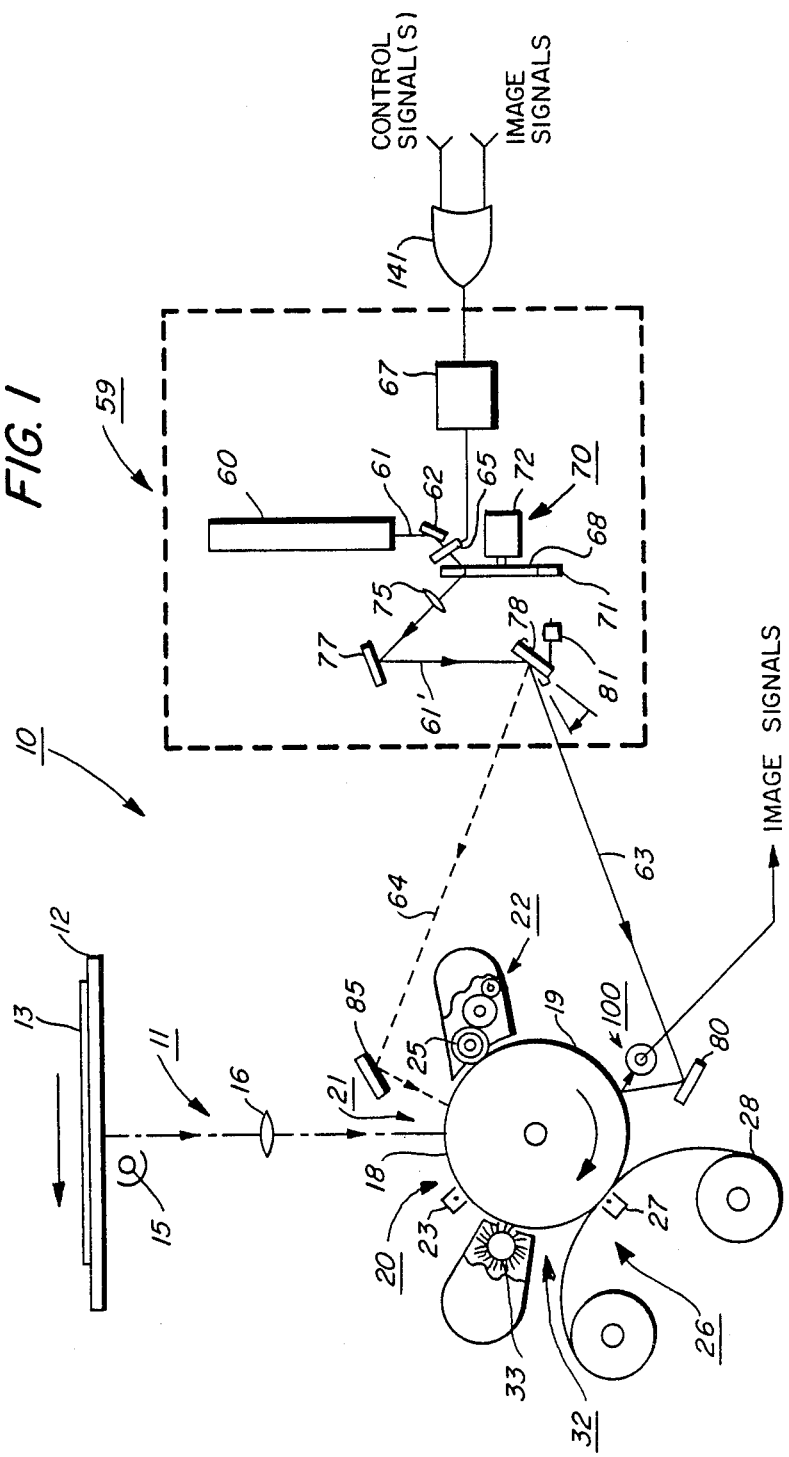
FIG. 1 is a schematic view showing an exemplary multi-mode reproduction apparatus incorporating the intensity control of the present invention.
Figure 2:
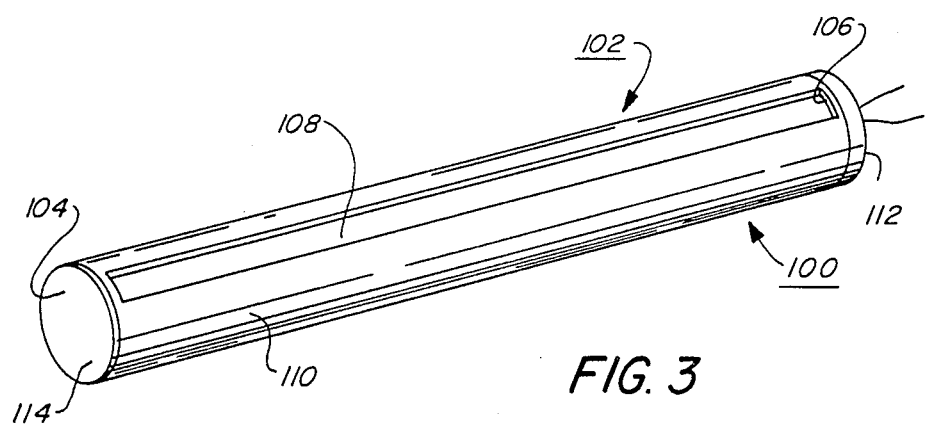
FIG. 2 is an isometric view showing details of the light collector used to collect and convert light reflected from the apparatus photoconductive surface to image signals or pixels.

Referring now particularly to FIGS. 1 and 2 of the drawings, there is shown an exemplary xerographic type reproduction apparatus 10 incorporating the present invention. Xerographic reproduction apparatus 10 includes a viewing station or platen 12 where document originals 13 to be reproduced or copied are placed. For operation in the COPY mode as will appear more fully herein, a light/lens imaging system 11 is provided, the light/lens system including a light source 15 for illuminating the original 13 at platen 12 and a lens 16 for transmitting image rays reflected from the original 13 to the photoconductive surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example comprise a magnetic brush 25, is provided at developing station 22 for developing the latent electrostatic images created on drum 18.

At transfer station 26, corona transfer means 27 effects transfer of the developed image to a suitable copy substrate material 28. A suitable drum cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted. A suitable erase lamp (not shown) may be provided to discharge residual charges on the photoconductive surface 19 prior to charging by charging means 23.

In the example shown, photoconductive surface 19 comprises a uniform layer of photoconductive material such as amorphous selenium on the surface of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated, other photoconductor types such as belt, web, etc. may be envisioned. Photoconductive materials other than selenium, as for example, organic, may also be contemplated. And, while a scan type imaging system is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render drum 18 wholly or partially transparent. One material consists of an aluminized Mylar substrate having a layer of selenium dispersed in poly-N-vinyl carbazole with a transparent polymer overcoating containing a charge transport compound such as pyrene.

Xerographic reproduction apparatus 10 includes a flying spot scanner 59. Scanner 59 has a suitable flux source of electromagnetic radiation such as laser 60. The collimated beam 61 of monochromatic radiation generated by laser 60 is reflected by mirror 62 to a modulator 65, which for operation in the WRITE mode, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61. Modulator driver 67 serves to drive modulator 65 in accordance with an image (IMAGE SIGNALS) or control (CONTROL SIGNALS) signal input as will appear.

Beam 61 is diffracted by disc reflector 68 of a holographic deflector unit 70. Deflector 68 comprises a substantially flat disc-like element having a plurality of grating faces or facets 71 forming the outer periphery thereof. Deflector 68 which is preferably glass, is driven by motor 72. Preferably, deflector 68 is disposed so that light beam 61 is incident to the facets 71 thereof at an angle of substantially 45°. The diffracted scanning beam 61' of output by deflector 68 exits at a complementary angle.

The scanning beam 61' output by deflector 68 passes to an imaging lens 75. As shown, lens 75 is located in the optical path between deflector 68 and mirror 77, lens 75 being of a diameter suitable to receive and focus the scanning light beam diffracted by facets 71 of deflector 68 to a selected spot in the focal plane proximate the surface 19 of drum 18, as will appear.

The scanning beam 61' from lens 75 is reflected by mirror 77 to read/write control mirror 78, which in turn, reflects the beam to provide selectively image READ beam 63 (shown by solid line in FIG. 1) or image WRITE beam 64 (shown by dotted line in FIG. 1). Image READ beam 63 is reflected by mirror 80 to a location on the surface 19 of drum 18 downstream of developer 22, while image WRITE beam 64 is reflected by mirror 85 to a location on surface 19 upstream of developer 22.

In the case where the photoconductive material is opaque, a portion of the light from READ beam 63 when operating in the READ mode impinging on the surface 19 of drum 18 is reflected. In the case where the photoconductive material is transparent, the light is transmitted, depending on the degree of transparency of the photoconductive material through the photoconductive material to the drum interior. As will be understood, reflected light is composed of both specular and diffuse reflected light while transmitted light is composed of specular and diffuse transmitted light. The reflected or transmitted light from the photoconductive surface 19 of drum 18 and the developed image thereon is collected in collector 100, and there converted to image signals, as will appear.

Read/write control mirror 78 is supported for limited movement between a READ position (shown in solid line in the drawing) and a WRITE position (shown in dotted line in the drawing). A suitable driving mechanism such as solenoid 81 is provided to selectively move the mirror 78 from one position to the other. Return spring means (not shown) may be provided to return mirror 78 to the original position upon deenergization of solenoid 81.

Figure 3:
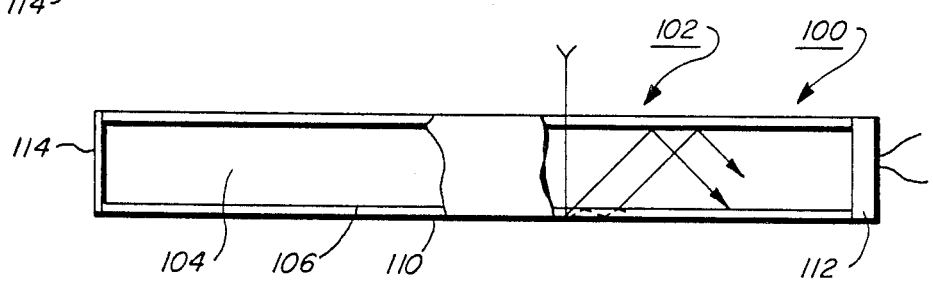
FIG. 3 is a cross-sectional view of the light collector shown in FIG. 2.

Referring particularly to FIGS. 2 and 3, the exemplary collector 100 there shown comprises a rod-like element 102, the inner or central core 104 of which is comprised of a relatively hard homogenous transparent material such as glass, plastic, etc. One suitable material comprises polymethyl methacrylate.

To protect the rod 102 against the loss in light collecting efficiency due to accumulations of dirt, toner dust, and the like on the rod surface, particularly from toner dust originating from the nearby developing station 22, and to improve collector efficiency, the outer surface of core 104 is covered, i.e. clad, with a suitable cladding material 106 having an index or refraction lower than the index of refraction of core 104. One suitable cladding material 106 comprises a low-index fluorocarbon compound.

The outer periphery of the cladding material 106, except for a slit-like aperture 108 extending axially along the length of rod 102 is covered with a suitable light diffusing coating or covering 110 which may for example comprise titanium dioxide. A suitable light detector such as a photocell 112 is provided at one end of the rod 102 for sensing light transmitted axially along the collector interior. A suitable specular reflecting surface 114 such as aluminum foil, is preferably provided at the opposite end of collector 100 to reflect light back along the rod interior toward photocell 112. Alternately, the reflecting surface may comprise a suitable diffusing material.

Collector 100 is supported in spaced relation to the photoconductive surface 19 by suitable means (not shown), with the slit-like aperture 108 facing the photoconductive surface 19. Preferably, the longitudinal axis of collector 100 is parallel with the axis of rotation of drum 18.

Figure 4:
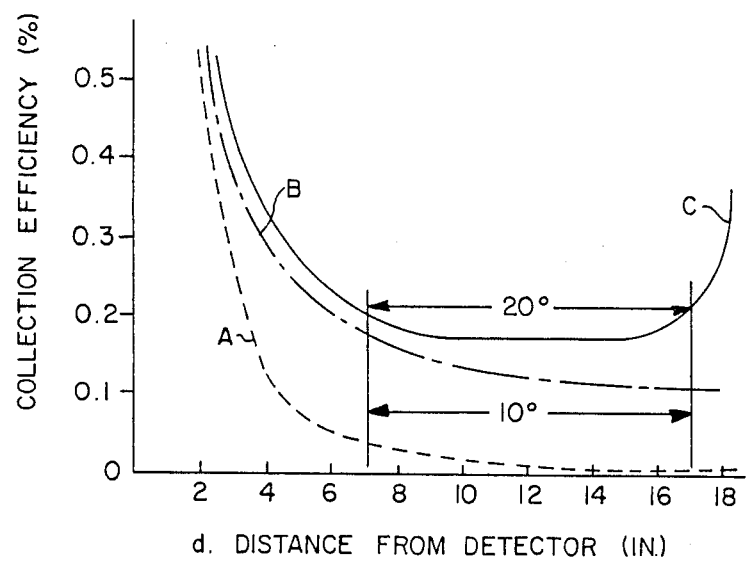
FIG. 4 is a graph showing collection efficiency for various light collector designs.

Referring to FIG. 4, curves A and B demonstrate the change in efficiency of the collector 100 with changes in distance (d) between the point at which the reflected light enters the collector 100 and photocell 112. Essentially, collection efficiency decreases with increases in the distance d in a substantially expontential manner. In curve C of FIG. 4, a typical change in collection efficiency is shown for a collector type having a reflective surface at the end of the collector rod 102 opposite photocell 112. The use of a second photocell at the opposite end somewhat improves performance. However, economic considerations, i.e. the added cost of an additional photocell, renders use of a single photocell preferable.

Figure 5:
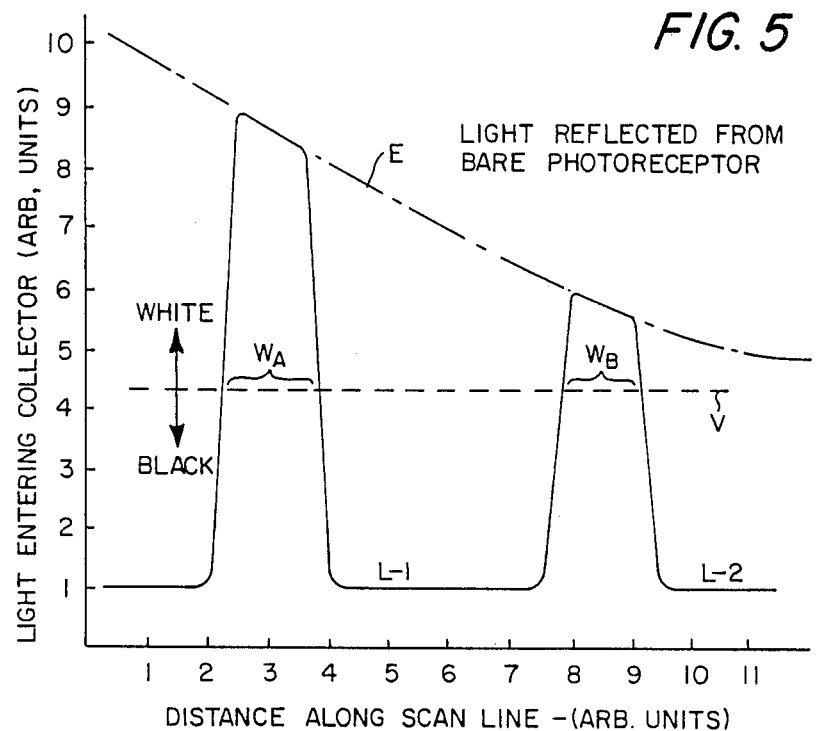
FIG. 5 is a graph showing the effect of non-uniform response on image line width.

Architectural constraints point to the need to make collector 100 as short as possible. However, it is also realized that the closer the photocell 112 is to either end of the collector rod 102, the greater the variability in the response of the collection optics as may be seen from the graphical representation of FIG. 5. As there seen, a non-uniform response (curve E) may result in the assignment of different widths (WA, WB) to image lines (designated as L-1 and L-2 herein) which are in fact the same. This is due to the sampling of lines L-1 and L-2 at different points by the constant threshold potential V, namely, the fact that line L-1 is sampled at approximately 50% of line L-1's height while line L-2 is sampled at a point greater than 50% of line L-2's height. As a result, not only can lines of the same width appear to be of different width, but low density solid areas may be missed altogether.

Figure 6:
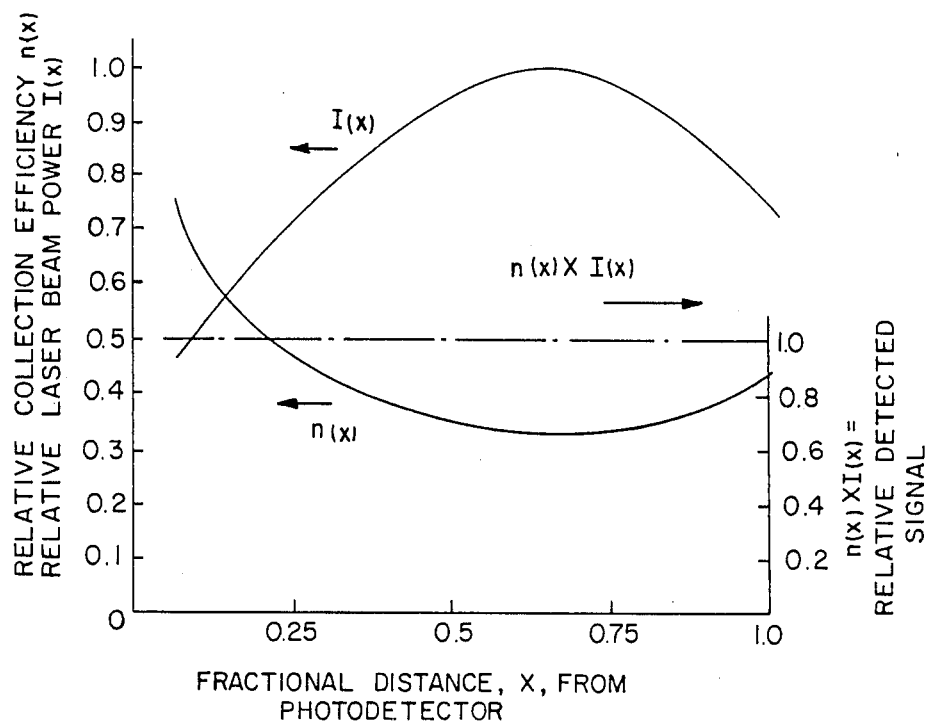
FIG. 6 is a plot depicting the uniform collection response achieved by the present invention.

Referring to FIG. 6, to in effect flatten the response of collector 100 along a scan line, the light (i.e. READ beam 63) illuminating the toned image on photoconductive surface 19 is varied for each scan line in inverse proportion to the efficiency of the collector 100 to achieve as uniform response as practicable. The amount of reflected light at any point (x) along a scan line which reaches photocell 112 may be expressed by the following relation:

$$L(x) = I(x) \times n(x) \text{ where}$$

L(x) represents the amount of light;
I(x) the light intensity at point x; and
n(x) the collection efficiency at point x.

As shown by FIG. 6, by varying the light intensity I(x), the product $I(x) \times n(x)$ can be keep constant.

To effect the foregoing, an intensity control signal S is input to driver 67 to control the intensity of the light beam emitted by modulator 65 during the image READ mode. Where the modulator comprises an acousto-optic type modulator such as modulator 65, it will be understood that the control signal S may be used to vary or control, through the modulator driver 67, the power of the acoustic pulse produced in modulator 65 which in turn varies the intensity of the light beam 61' emitted therefrom.

Where modulator 65 comprises a Total Internal Reflection (TIR) type, the light intensity of the output beam may be controlled by varying the voltage applied across the modulator interdigitated electrodes. Where a laser diode is employed as the source of light in place of the laser 60 described herein, it is understood that direct control over the laser diode is provided which eliminates the need for a separate modulator such as modulator 65 and modulator driver 67. In that application, the drive current to the laser diode itself is controlled in accordance with a control signal S to in turn regulate the intensity of the beam output by the laser diode to the system during operation in the READ mode.

Figure 7:
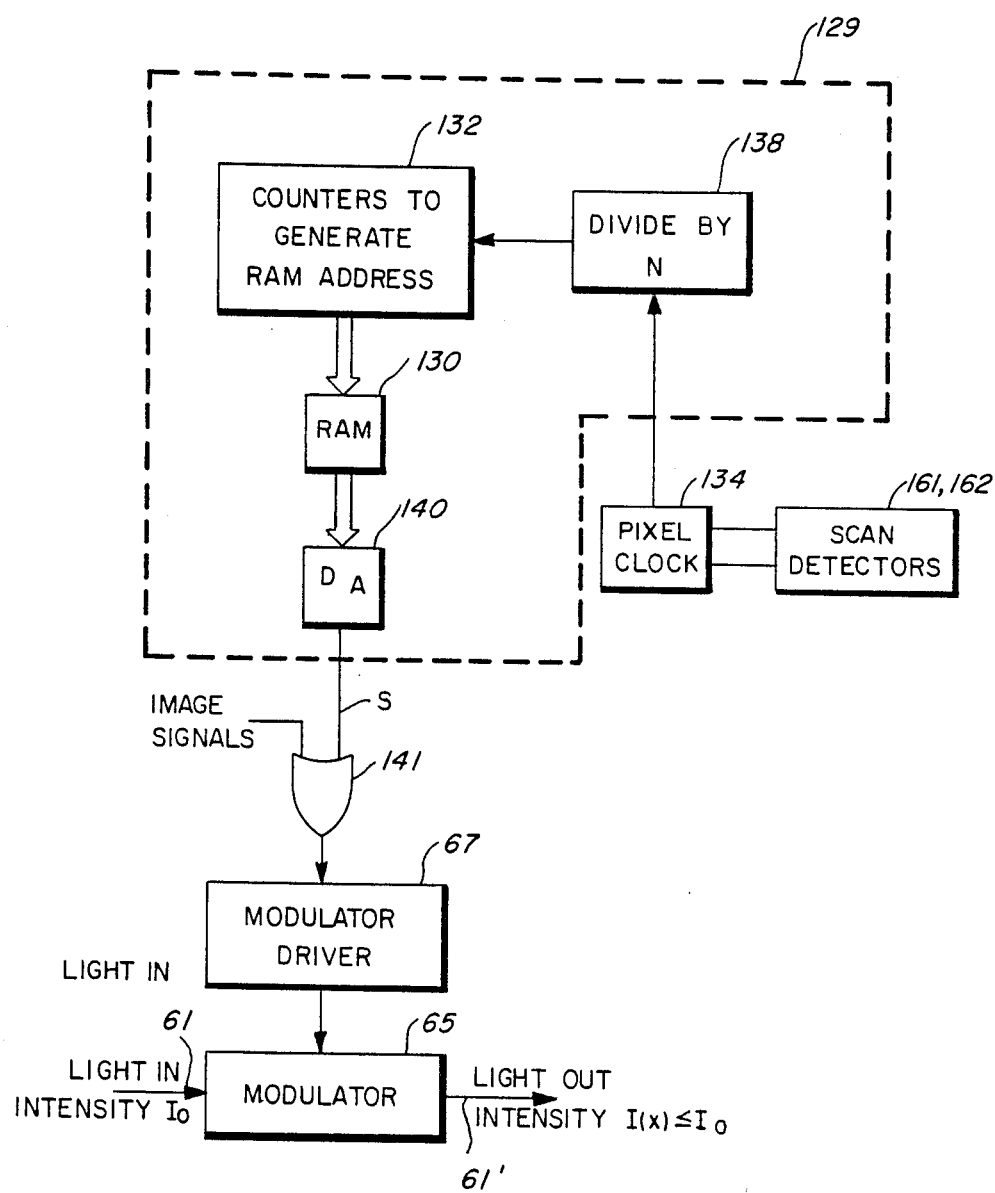
FIG. 7 is a circuit schematic of the intensity control of the present invention.

Referring now to FIG. 7 of the drawings, the intensity control signal S, which represents the optimum or desired profile of the illumination versus distance along a scan line, is derived initially by making one or more calibration runs and storing the intensity data obtained in a suitable memory such as RAM 130 of intensity control 129. The calibration run or runs, which may be conducted periodically, i.e. at the beginning of the day, or before each copy run, etc., are made by operating the reproduction apparatus 10 in the READ mode and scanning the photoconductive surface 19 of drum 18 with surface 19 fully exposed, i.e. in the absence of an image. This may be effected by operating the reproduction apparatus 10 without a document original 13 on platen 12 or by using a calibration original, such as an all white document, on platen 12. The image signals generated by photocell 112 are stored in RAM 130 at predetermined address locations during calibration.

A suitable addressing counter 132 is provided for addressing the contents of RAM 130 when it is desired to utilize the previously stored intensity data and provide the intensity control signal S. Clocking pulses for driving addressing counter 132 are taken from the pixel clock 134 to assure synchronism between the pixel being read out and the intensity control 129.

Preferably, intensity control is exercised in sub-multiples or blocks of pixels (i.e. 16) rather than on a pixel by pixel basis. For this purpose, intensity control 129 includes divide-by-n counter 138 disposed in series with the incoming stream of clocking pulses from pixel clock 134 to addressing counter 132. For example, where the intensity is to be varied every 16 pixels of a scan line, counter 138 would comprise a divide-by-16 counter.

Intensity data from RAM 130 of intensity control 129 is fed to a suitable Digital-to-Analog (D/A) converter 140 where the digital output of RAM 130 is converted to an analog control signal S. The control signal S output of intensity control 129 is fed via OR function gate 141 to the control gate of modulator driver 67. As will be understood, the application of control signal S to the driver 67 varies the power of the acousto-optic pulse produced in modulator 65 which in turn varies the intensity of the light beam 61' output from modulator.

Figure 8:
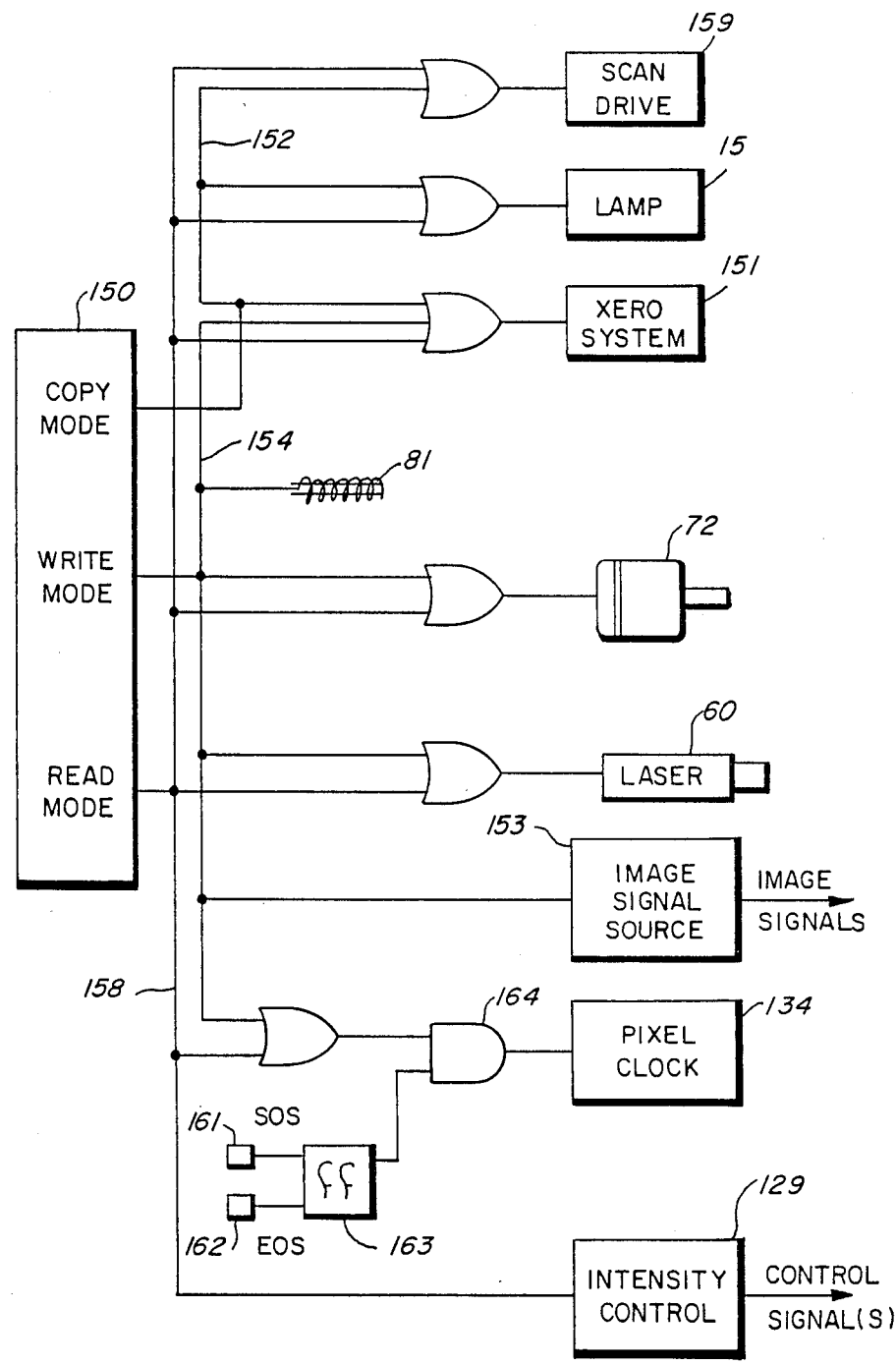
FIG. 8 is a circuit schematic of the control system for the apparatus shown in FIG. 1.

Referring particularly to FIG. 8 of the drawings, a suitable mode selector or controller 150 is provided to enable the operator or user to select the mode of operation, i.e. COPY, WRITE, or READ, desired. Where COPY mode is selected, the signal output of controller 150 to line 152 actuates the various components that comprise the xerographic system, i.e. drum 18, charge corotron 23, magnetic brush 25, transfer corotron 27, etc. (collectively identified herein as xerographic system 151). Exposure lamp 15 and the scan driving mechanism (identified generally by the numeral 159) for providing scanning motion between platen 12 and lens 16 are also actuated by the signal from controller 150 in this mode.

Where the WRITE mode is selected, the signal output of controller 150 to line 154 readies xerographic system 151. Laser 60 and reflector drive motor 72 are also operated, the latter to drive disc reflector 68 and sweep the beam of light output by laser 60 across the photoconductive surface 19 of drum 18. Solenoid 81 is energized to move mirror 78 and provide WRITE beam 64. The image signal source 153, which serves to supply the image or pixel signal input to driver 67 of modulator 65 (IMAGE SIGNALS), and pixel clock 134 are also readied for operation.

To correlate motion of WRITE beam 64 (and READ beam 63) across the photoconductive surface 19 of drum 18 with the input of image signals from image signal source 153 (in the WRITE mode) or control signal S (in the READ mode), suitable start of scan (SOS) and end of scan (EOS) detectors 161, 162 respectively are provided in the path of the scanning beam to identify and delimit the start and end of the scan line. The output signals of detectors 161, 162 are input to the set and reset gates of a control flip flop 163. The output of flip flop 163 is input to AND function gate 164 controlling actuation of pixel clock 134 such that on detection of the scanning beam by SOS sensor 161, pixel clock 134 is enabled, and on detection of the scanning beam by EOS sensor 162, pixel clock 134 is disabled.

Where the READ mode is selected, the signal output of controller 150 to line 158 readies xerographic system 151, scan drive 159, exposure lamp 15, laser 60, reflector drive motor 72, and pixel clock 134 in the manner described above. Concurrently, the signal from controller 150 readies intensity control 129 to provide intensity modulating signals (CONTROL SIGNALS) to modulator 65 as will appear.

Operation

In the COPY mode, latent electrostatic images are formed on the photoconductive surface 19 of drum 18 through exposure of the document 13 on platen 12 as described heretofore. In the WRITE mode, latent electrostatic images are created on the charged photoconductive surface 19 of drum 18 by means of the flying spot scanner 59 in accordance with image signal output of image signal source 153. In this mode, solenoid 18 is energized to move control mirror 78 to the WRITE position (the dotted line position shown in FIG. 1). In this position, mirrors 78, 85 cooperate to provide image WRITE beam 64 at a point on the surface 19 of drum 18 upstream of developing station 22. Modulator 65 modulates the light intensity of beam 64 in accordance with the content of the image signals input thereto so that image WRITE beam 64 dissipates the electrostatic charge on the drum surface to create a latent electrostatic image representative of the image signals input thereto as beam 64 scans thereacross. The electrostatic latent image so created is thereafter developed by magnetic brush 25 and transferred to copy substrate material 28 by corona transfer means 27 at transfer station 26. Following transfer, the surface of drum 18 is cleaned by cleaning brush 33 as described.

In this mode, and in the image READ mode described below, reflector 68 is continually driven at substantially constant velocity by motor 72 with the output of both the image signal source 153 in the WRITE mode and the output of intensity control 129 in the READ mode controlling the image signal source so as to be synchronized with rotation of reflector 68. The rotational rate of xerographic drum 18 which determines the spacing of the scan line, is preferably synchronized to the signal source in order to maintain image linearity.

In the image READ mode, where it is desired to read original 13 and convert the content thereof to image signals, solenoid 81 is deenergized to place control mirror 78 in the READ position (the solid line position shown in FIG. 1). In this position, mirror 78 cooperates with mirror 80 to provide image READ beam 63 on the surface 19 of drum 18 at a point downstream of developing station 22, beam 63 scanning across the surface of drum 18 and any image developed thereon.

In this mode, a latent electrostatic image of the original 13 on platen 12 is created on the surface 19 of drum 18 through exposure of the original 13 and subsequent development by magnetic brush 25 in the manner described heretofore. As the developed image is carried on drum 18 from developing station 22 to transfer station 26, the image is scanned line by line by image READ beam 63. The light is reflected from the photoconductive surface 19 in accordance with the presence or absence of toner on the drum surface, the reflected light being picked up by collector 100 and converted to image signals. As will be understood where the light beam strikes toner, the light is absorbed and no light is reflected. Where the light beam strikes uncovered portions of the photoconductive surface 19 of drum 18, a portion of the light is reflected back by the photoconductive surface to collector 100.

Light reflected from the photoconductive surface 19 during scanning of the developed image thereon by beam 63 when operating in the READ mode passes into the interior of collector 100 via the slit-like aperture 108. Light substantially normal to the collector 100 passes through the cladding material 106 and inner core 104 and strikes the light diffusing coating 110 which diffuses and reflects the light back toward the collector interior at various angles of incidence, the light returning through the cladding material 106 to the core 104 where the light is reflected back and forth along the core interior in a direction axial of rod 102. Due to the diffusion of the light beyond the critical angle of re-entry into core 104, some light passing through the cladding material 106 is reflected within the bounds of the cladding material, creating secondary diffusion.

The diffused light propagates axially along the length of rod 102 and the cladding material 106, the light being reflected by and within both the rod 102 and the cladding material 106. Light reaching the end of collector 100 adjacent photocell 112 is detected by photocell 112. Where reflecting surface 114 is provided, light transmitted through rod 102 and cladding material 106 and reaching the opposite end of collector 100 is reflected back along the axis of collector rod 102 toward photocell 112 by the reflecting surface 114 to intensify the brightness of the light striking photocell 112. Where the reflecting surface 114 is composed on a diffusing material, the light reaching the rod end is diffused back into the rod/cladding material interior.

Photocell 112 generates analog image signals in response to the presence or absence of light, the signal level being representative of the intensity of the light striking photocell 112. The resulting signal output of photocell 112 is representative of the developed image on the photoconductive surface scanned by image READ beam 63.

Image signals generated by collector 100 may be used to produce additional copies of the original 13, or stored, or transmitted to a distant point, etc.

Following scanning, the developed image on drum 18 may be transferred to substrate material 28 in the manner described heretofore. Alternately, transfer may be dispensed with and the drum surface cleaned by cleaning brush 33.

In the image READ mode, intensity control 129 is actuated by the signal from controller 150. As READ beam 63 sweeps across the photoconductive surface 19 of drum 18, RAM 130 of intensity control 129 is addressed in synchronism therewith by address counter 132 which is driven by the clocking signals output by pixel clock 134. The signal output of RAM 130 is converted to analog control signal S by D/A converter 140 and applied to driver 67 of modulator 65 to cause modulator 65 to modulate the intensity of the laser beam 63 in accordance therewith.

Figure 9:
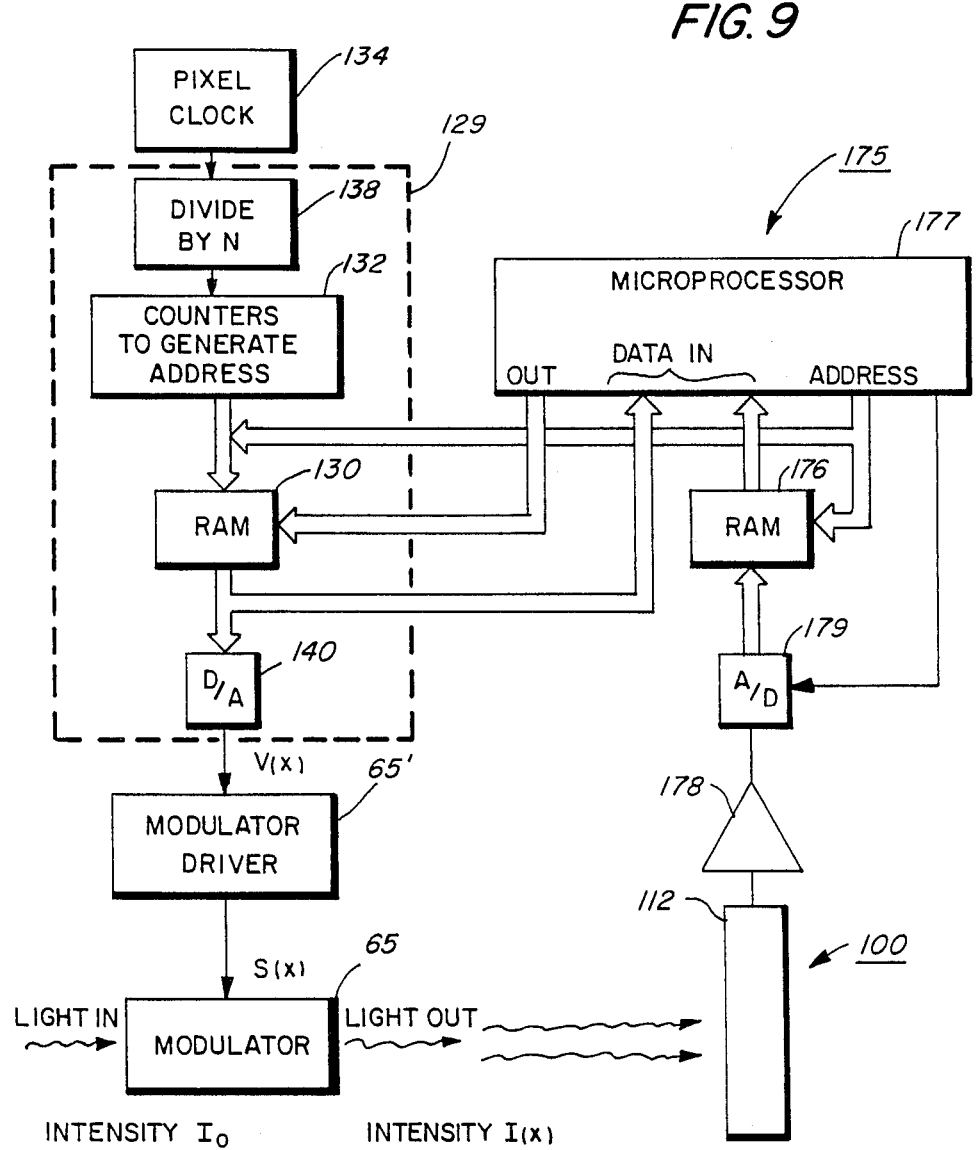
FIG. 9 is a circuit schematic of an alternate embodiment in which the light intensity values are monitored and updated in accordance with current operating conditions.

In the embodiment shown in FIG. 9, where like numbers refer to like parts, automatic generation of the required intensity profile is provided by the addition of intensity iterative circuit 175 to intensity control 129. Circuit 175 includes a suitable memory such as RAM 176 which serves as a scratch pad to store the output of photocell 112 of collector 100 as the laser beam scans the photoconductive surface 19 of drum 18 during calibration. A suitable microprocessor 177 is provided to interrogate the contents of RAM 176 and in response thereto reset the intensity values held in RAM 130 of intensity control 129. A suitable amplifier circuit 178 is provided for amplifying the image signal output of photocell 112 with analog to digital (A/D) converter circuit 179 provided for converting the analog image signal output of photocell 112 to digital for storage in RAM 176.

In this embodiment, divide-by-n counter 138 could be under the control of microprocessor 177. In operation, microprocessor 177, during operation in the READ mode, interrogates the contents of RAM 176 and compares the contents thereof with the corresponding intensity values stored in RAM 130 of intensity control 129. If the sequence of values in RAM 176 do not represent a constant intensity along the scan line, microprocessor 177 corrects the corresponding intensity values in RAM 130 to provide updated intensity values to assure a more nearly constant output from collector 100. Thus, the intensity correction factor $L(x)$ is updated until the product $I(x) \times n(x)$ is substantially constant along the entire scan line.

The aforedescribed autocorrelation system serves to correct for changes in modulator 65 and the collector 100 over an extended period of time. Where a change that is out of the normal range or ability to correct occurs, a fault signal may be generated indicating a major failure in the system and the need for service.

While the invention has been described with reference to the structure disclosed, it is not confined to the details set forth but is intended to cover such modifications or changes as may come within the scope of the following claims.

I claim:

1. In an apparatus for reading a document to provide image signals representative of the document image content wherein the document image content is xerographically processed to provide a developed image of the document image content on a photoreceptor for raster scanning by a high intensity beam of light, with light collecting means disposed in predetermined spaced relation with said photoreceptor for intercepting and collecting light reflections from said photoreceptor when scanning said developed image, said light collecting means including a collector tube, and light detecting means for generating image signals in response to the presence or absence of said light reflections, said collector tube capturing said light reflections and transmitting captured light axially within said collector tube to said light detecting means, the improvement comprising:

means for regulating the intensity of said beam as said beam scans across said photoreceptor to offset internal light transmission losses of said collector tube.

2. The apparatus according to claim 1 in which said beam intensity regulating means includes means for regulating the intensity of said beam in accordance with the distance traversed by said light reflections within said collector tube to said light detecting means.

3. The apparatus according to claim 1 in which said apparatus includes:

beam modulator means for modulating the intensity of said beam in accordance with intensity correction signals;

said beam intensity regulating means including memory means for storing scanning beam intensity correction values for discrete lengths of said collector tube; and control means for addressing said memory means in synchronism with scanning of said beam across said photoreceptor to provide said intensity correction signals.

4. The apparatus according to claim 3 in which said discrete lengths of said collector tube are defined by blocks of image signals, each of said image signal blocks comprising a predetermined number of image signals.

5. The apparatus according to claim 3 in which said apparatus includes:

means for writing images on said photoreceptor in response to an image signal input using said scanning beam and said beam modulator means whereby said beam modulator means serves to modulate said scanning beam both when writing and reading with said apparatus.

6. In an apparatus for reading a document to provide image signals representative of the document image content wherein the document image content is xerographically processed to provide a developed image of the document image content on a photoreceptor for raster scanning by a high intensity beam of light, with light collecting means disposed in predetermined spaced relation with said photoreceptor for intercepting and collecting light reflections from said photoreceptor when scanning said developed image, said light collecting means including a collector tube, light detecting means for generating image signals in response to the presence or absence of said light reflections, said collector tube capturing said light reflections and transmitting captured light axially within said collector tube to said light detecting means, beam modulator means for modulating the intensity of said beam in accordance with intensity correction signals, said beam intensity regulating means including memory means for storing scanning beam intensity correction values for discrete lengths of said collector tube, and control means for addressing said memory means in synchronism with scanning of said beam across said photoreceptor to provide said intensity correction signals, the improvement comprising:

means for regulating the intensity of said beam as said beam scans across said photoreceptor to offset internal light transmission losses of said collector tube, said beam intensity regulating means including means to monitor the image signal output of said light detecting means for changes in beam intensity, and correction signal adjusting means for adjusting said intensity correction signals in response to changes in scanning beam intensity whereby to maintain a substantially constant image signal output.

* * * * *